United States Patent [19]
Puckett et al.

[11] 3,992,587
[45] Nov. 16, 1976

[54] REMOTE DATA LINE MONITOR

[75] Inventors: Dennis E. Puckett; Dale A. Heatherington, both of Decatur; Eugene C. Jones, Tucker, all of Ga.

[73] Assignee: National Data Corporation, Atlanta, Ga.

[22] Filed: Aug. 19, 1974

[21] Appl. No.: 498,615

[52] U.S. Cl. ............................. 179/2 C; 179/2 A; 179/2 DP
[51] Int. Cl.² .................... H04M 11/06; H04Q 9/00
[58] Field of Search ............... 179/2 C, 2 A, 2 DP; 178/4.1 R; 340/149 R, 152 R

[56] References Cited
UNITED STATES PATENTS

| | | | |
|---|---|---|---|
| 3,383,467 | 5/1968 | New et al. | 179/2 DP |
| 3,388,375 | 6/1968 | Sloughter | 179/2 C |
| 3,400,378 | 9/1968 | Smith et al. | 179/2 A |
| 3,516,062 | 6/1970 | Spraker | 179/2 DP |
| 3,647,971 | 3/1972 | Cushman et al. | 179/2 A |
| 3,800,090 | 3/1974 | Matena | 179/2 A |
| 3,821,705 | 6/1974 | Chertok et al. | 179/2 DP |
| 3,842,208 | 10/1974 | Paraskevakos | 179/2 A |

Primary Examiner—Thomas A. Robinson
Attorney, Agent, or Firm—Cushman, Darby & Cushman

[57] ABSTRACT

A device that permits local or remote access to data circuits for the purpose of monitoring, testing and performing diagnostics. It may be used to issue commands to perform various functions whereby the device couples a given circuit to a telephone line in response to coded signals identifying the device and the circuit to be interrogated.

18 Claims, 10 Drawing Figures

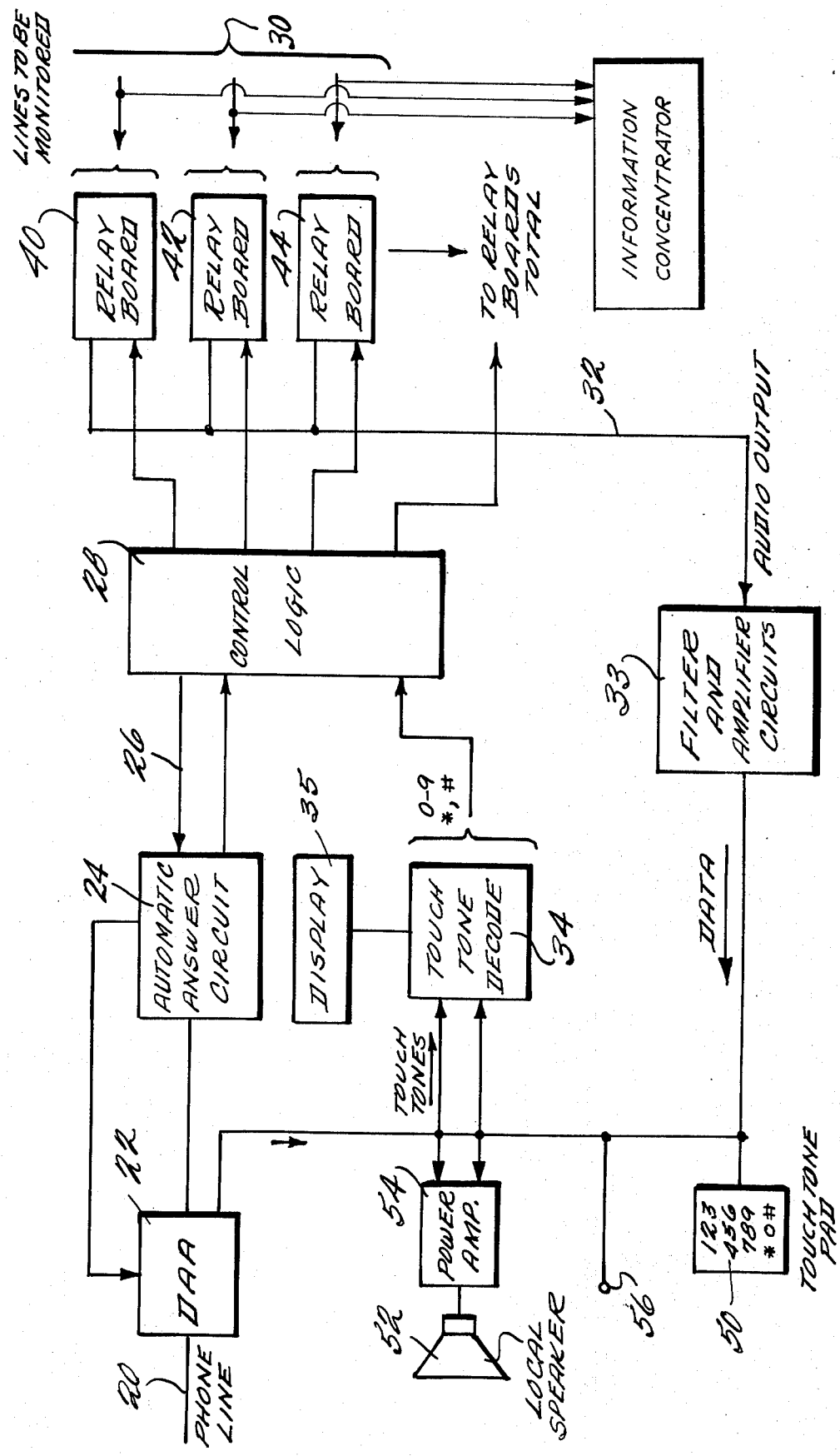

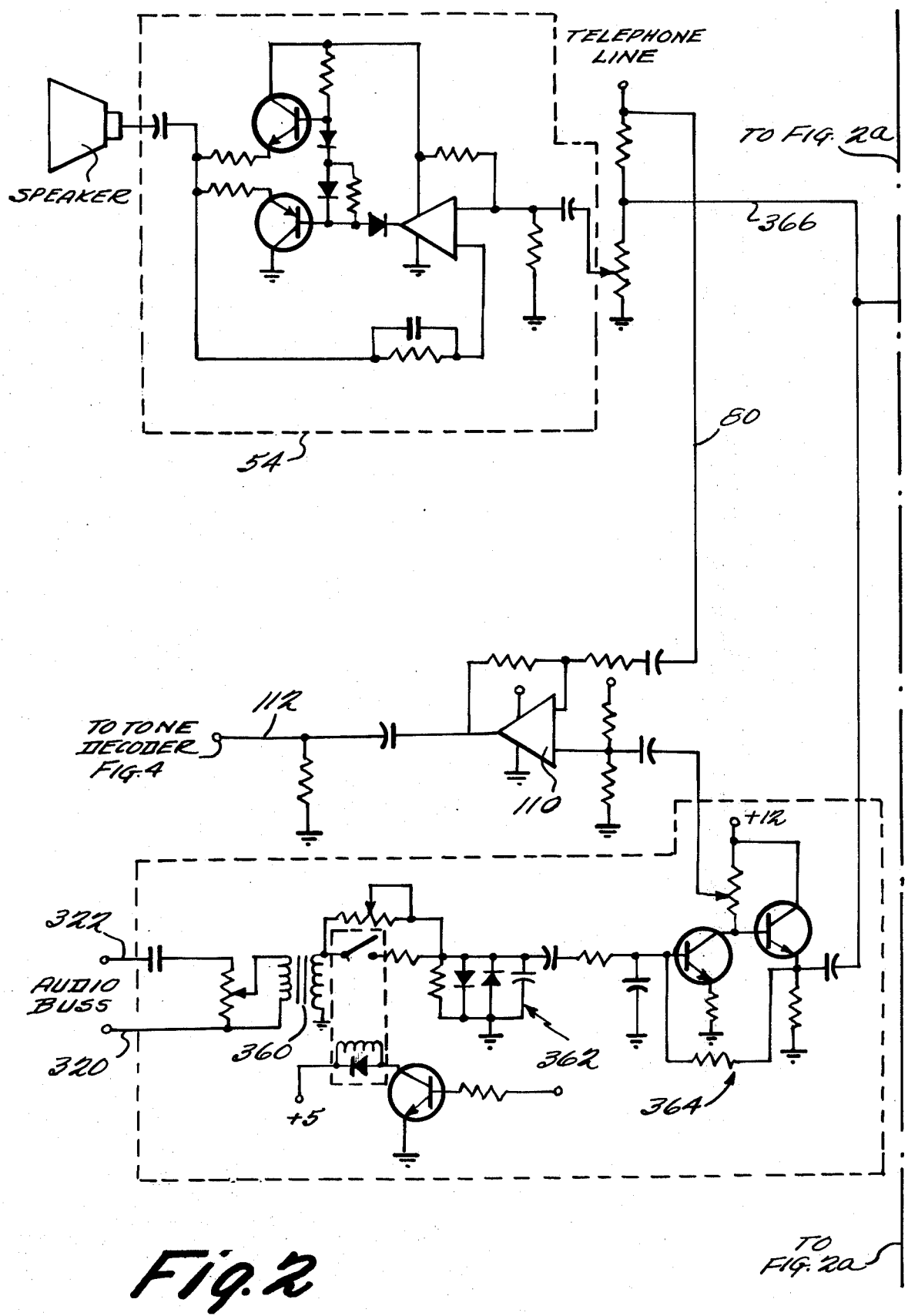

REMOTE DATA LINE MONITOR

BRIEF DESCRIPTION OF THE PRIOR ART AND SUMMARY OF THE INVENTION

The invention relates to an apparatus for monitoring a remote data line utilizing conventional telephone circuits for coupling that remote line to a telephone line for monitoring, testing or performing diagnostics.

Telephone lines are now widely employed for transmitting data, and particularly for transmitting data from a remote terminal to a central computer location where the computer receives and manipulates the data to produce records or the like. In order to make most efficient use of expensive telephone lines, it is conventional to utilize data multiplexers, mini computers, and other similar electronic devices to receive information on each of a plurality of lines from remote terminals and to transmit that information on a single telephone line to a computer which may be thousands of miles away.

One problem which arises with such multiplexing, however, is that it is not normally possible for computer personnel at the central location to directly monitor the remote data lines to determine which of the lines is causing a problem and to accurately diagnose the problem. All the computer personnel can monitor is the information coming in from the multiplexer on a single line and usually this is insufficient to determine which of the several lines coming into the multiplexer is malfunctioning. Often the multiplexer location is not staffed by human personnel at all times. Accordingly, when this is the case, the only practical way to actually diagnose the problem is to send someone to the multiplexer to actually monitor each of its input lines and transmit that information to the central computer site. Not only does this often take several hours during which the system is disrupted, but is, of course, expensive in requiring payment of overtime, etc.

The present invention relates to a simple, inexpensive and reliable circuit which can be connected to the data lines coming into the multiplexer at the remote location where those data lines are multiplexed or the information otherwise concentrated for transmittal to the central location. The circuitry has associated with it a unique telephone number which, when dialed by someone at the central facility or otherwise, connects the data monitor to the central facility via the telephone lines. Each of the data lines is associated with a unique coded number so that, when that number is entered into the interrogating telephone by a touch-tone pad, a dial or the like, the data monitor decodes the signal and operates a relay associated with the identified line to couple that line to an audio buss. The information on the audio buss is then applied to the telephone line and transmitted back to the remote station where it can be monitored and any problem diagnosed. Each of the data lines coming into the data monitor can be quickly and simply checked in this fashion.

In the embodiment of the invention described in detail below, the circuitry preferably includes a local speaker at the data monitor and a telephone touch-tone pad or the like for permitting the data lines at the remote terminal to also be monitored at the local site. The circuitry can couple to either the transmit or receive side of the line.

Many other objects and purposes of the invention will become clear from the following detailed description of the drawings.

BRIEF DESCRIPTION OF THE DRAWINGS

FIG. 1 shows a block diagram of the unique data monitor of this invention.

FIGS. 2 and 2a when placed side by side show a detailed schematic of portions of the control logic, the audio amplifier for the local speaker and the input circuitry.

FIG. 8 shows a detailed schematic of the display driver circuitry.

DETAILED DESCRIPTION OF THE DRAWINGS

Figure 2A:
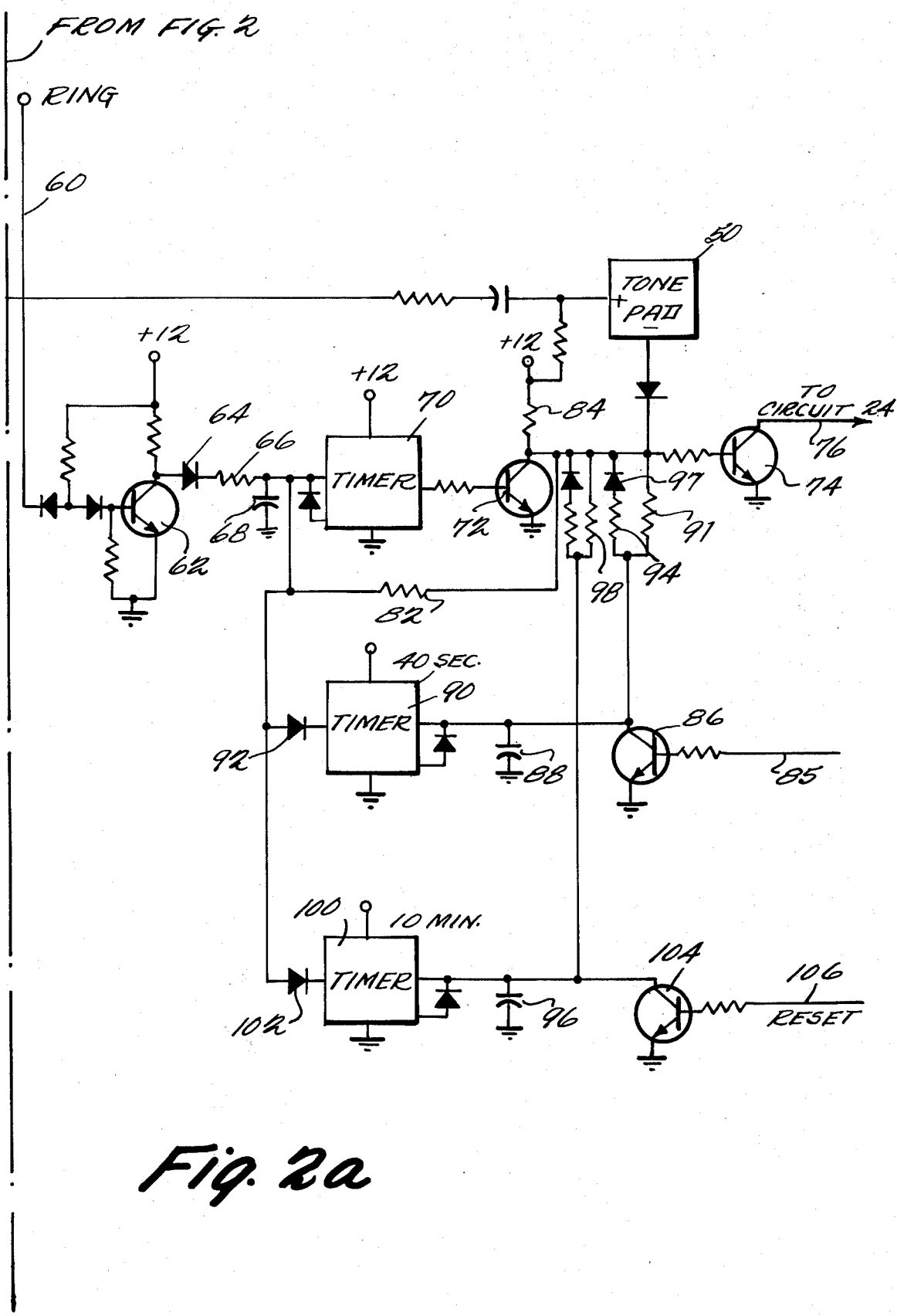

Reference is now made to FIG. 1 which illustrates in block diagram the unique data monitor of this invention. As indicated briefly above, the data monitor is conventionally connected to a telephone line 20 such that when the number identifying the data monitor is manually dialed or entered into a touch-tone pad or otherwise entered into the telephone grid, the remote telephone is coupled to line 20 and conventional telephone signals are received in the data monitor and routed by the conventional data access and acquisition terminal 22. Terminal 22 is coupled to another conventional element 24 which functions to cause the line to be answered, i.e., the data monitor coupled to line 20, when an appropriate signal is received on line 26 from the control circuit 28 discussed in detail below. Both terminal 22 and circuit 24 are conventional devices and are not illustrated nor discussed in detail below.

Once the line has been answered, the telephone at the remote end of line 20 can enter a coded signal identifying one of a plurality of data lines, generally indicated as 30, which is to be monitored. Data lines 30 are also connected, as described above to an information concentrator such as a multiplexer, or the like. The data monitor then responds by coupling that identified line to an audio buss 32 so that, after amplification and filtering in a conventional filter and amplifier as circuit 33, the information on the identified remote data line is directly coupled to phone line 20 and can be heard at the remote telephone at the other end of phone line 20.

The coded signals identifying the desired line may be in the form of combinations of audio tones conventionally known as touch tones. These tones are decoded by a circuitry 34 which identifies the desired line to be interrogated and applies a signal to the control circuitry 28 which in turn applies a signal to one of a plurality of relay boards with boards 40, 42 and 44 illustrated in the block diagram of FIG. 1. In the particular arrangement which is described in detail it is contemplated that 10 relay boards will be employed, permitting the data monitor to monitor both the receive and transmit sides of 49 remote data lines indicated generally as 30. Each relay board includes a plurality of relays each associated with one side of a data line and that relay is activated by the signal from control logic 28 to close switches to connect the associated data line to the audio buss 32.

As indicated briefly above, the data monitor also preferably includes a conventional touch-tone pad 50 and a local speaker 52 which is connected to audio buss 32 via power amplifier 54 for permitting a code identifying a data line to be entered at the data monitor location and the information on that line to be actually heard at the local station. The circuitry also preferably includes an output jack generally indicated at 56 for applying the signals on the audio buss 32 to a meter or other diagnostic tool at the data monitor itself. Thus, the data monitor can be used not only for remote monitoring of the data lines but monitoring at the multiplexer itself.

Reference is now made to FIGS. 2 and 2a which illustrate a detailed schematic of portions of the data monitor circuitry including portions of the control logic 28, the power amplifier 54 and the filter and amplifier circuit 33. The conventional telephone grid now in use provides a ring signal to a telephone identified by a dialed number which periodically grounds the incoming telephone line for a short time. In the data monitor of this invention, this signal is applied to the data monitor on line 60 and is coupled to the base of normally saturated transistor 62. The collector of transistor 62 is connected via diode 64 and resistor 66 to a capacitor 68 which begins to charge when line 60 is grounded shifting transistor 62 to its non-conductive condition. After a number of rings, for example, three groundings of line 60, capacitor 68 is charged to a voltage sufficient to trigger conventional timer 70. By requiring at least three rings, some measure of protection is provided against inadvertent operation of the circuitry by a wrong number or noise on line 60.

Timer 70 responds by shifting its output condition from a high to a low level, causing transistor 72 to shift from its normal conductive condition to a nonconductive condition which causes the power supply to be disconnected from the local touch-tone pad 50. This prevents any interrogation with the local touch-tone pad while remote monitoring is continuing. The shifting of transistor 72 also causes transistor 74 to shift to a conductive condition, grounding line 76 which is connected to the automatic answering circuit 24 so that circuit 24 now answers the phone, coupling phone line 20 to line 80 within the data monitor.

The collector of transistor 72 is connected to capacitor 68 via resistor 82 so that when transistor 72 shifts from its conductive to its non-conductive condition capacitor 68 is kept charged by a current path through resistors 82 and 84. There are now two ways in which line 80 can be disconnected from line 20.

Line 85 is connected to the counters within the control logic circuit 28 so that a voltage is applied to line 85 to keep transistor 86 saturated so long as the monitoring continues. So long as line 85 remains at a high voltage, transistor 86 remains conductive, preventing capacitor 88 from charging. Capacitor 88 is connected as illustrated to the input to timer 90, while the output of timer 90 is coupled to capacitor 68. When line 85 shifts to a low voltage causing transistor 86 to shift to its non-conductive condition, capacitor 88 begins to charge through resistor 91. Line 85 is connected to the output of a counter in the control logic illustrated in detail in FIG. 5 and line 85 shifts to a low output when the counter in the control logic is reset in response to receipt of a reset signal as explained further below.

The values of capacitor 88 and resistor 91 are chosen such that it takes about 40 seconds for capacitor 88 to charge to a voltage sufficient to trigger conventional timer circuit 90, which then shifts to its low output condition permitting capacitor 68 to discharge via diode 92. When capacitor 68 has discharged below the level necessary to keep timer circuit 70 in its low output condition, timer circuit 70 shifts that output, causing transistor 72 to resume its normal conductive condition which grounds the base to transistor 74. Transistor 74 then becomes non-conductive causing automatic answer circuit 24 to disconnect the data monitor from phone line 20. Capacitor 88 now discharges via resistor 94 and diode 97. Thus the data monitor will hang up if a digit signal is not received.

A second timer having a longer period than timer 90 is also provided as an additional guarantee that the data monitor will be correctly disconnected from the phone line even if the reset signal is not received. Capacitor 96 is connected to a 12-volt source via resistor 84 and resistor 98 so that capacitor 96 begins to charge when transistor 72 shifts away from its normal non-conductive condition. Capacitor 96 and resistors 98 and 84 are chosen such that capacitor 96 takes about 10 minutes to reach a voltage sufficient to trigger timer 100 which then shifts to its low input condition permitting capacitor 68 to discharge via diode 102. If, during the charging of capacitor 96, a reset signal is received, that signal is applied to the base of transistor 104 on line 106 causing that transistor to shift to its conductive condition which discharges capacitor 96. Thus, if a reset signal is not received within 10 minutes following the last receipt, the circuitry assumes something is wrong and automatically disconnects the data monitor from phone line 20.

Figure 4:
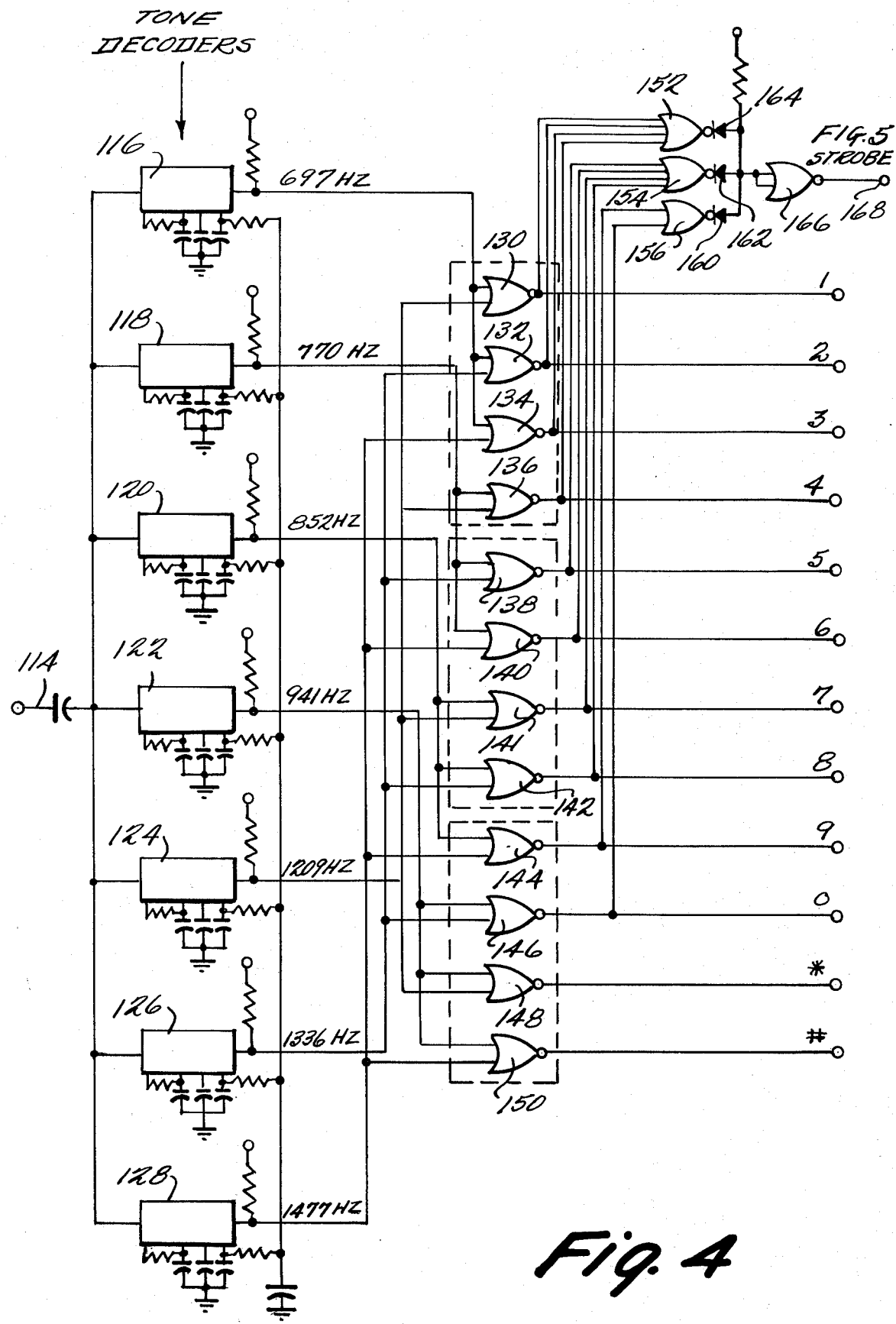
FIG. 4 shows a detailed schematic of the tone decoder.

Once the data monitor has been coupled to phone line 20 by the automatic answering circuit 24, a coded signal can then be transmitted from the remote location to the data monitor identifying one line to be coupled to the telephone line for monitoring. This coded information typically is in the form of combinations of tones received on line 80 and applied to a differential amplifier 110 in FIG. 2. During data transmission on the phone line from the data monitor, differential amplifer 110 removes outgoing data from incoming touch tone control signals. The output of differential amplifer 110 on line 112 is applied to the tone decoder input line 114 illustrated in FIG. 4.

Figure 5:
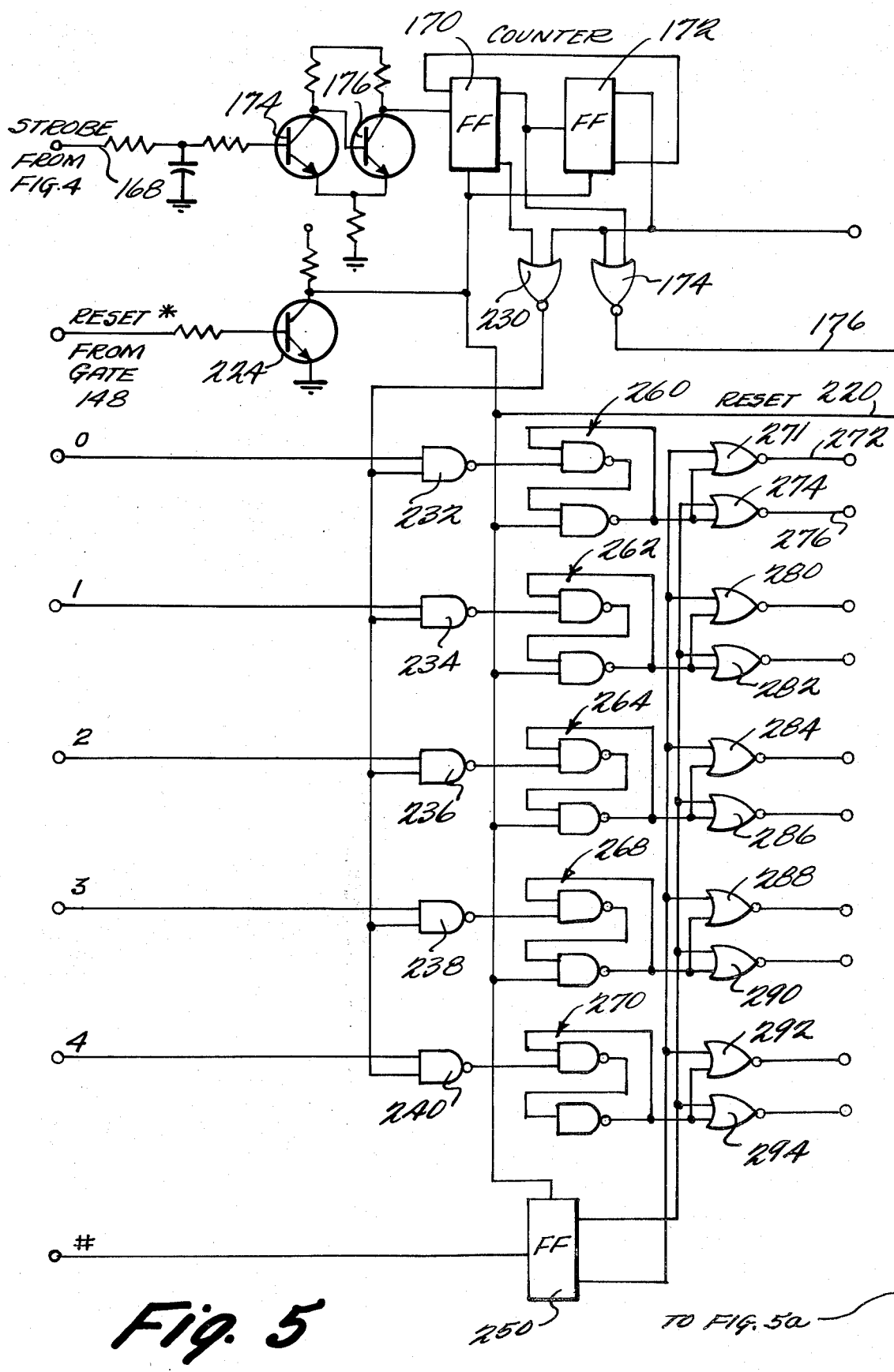
FIGS. 5 and 5a when placed side by side show a detailed schematic of the control logic.
Figure 5A:
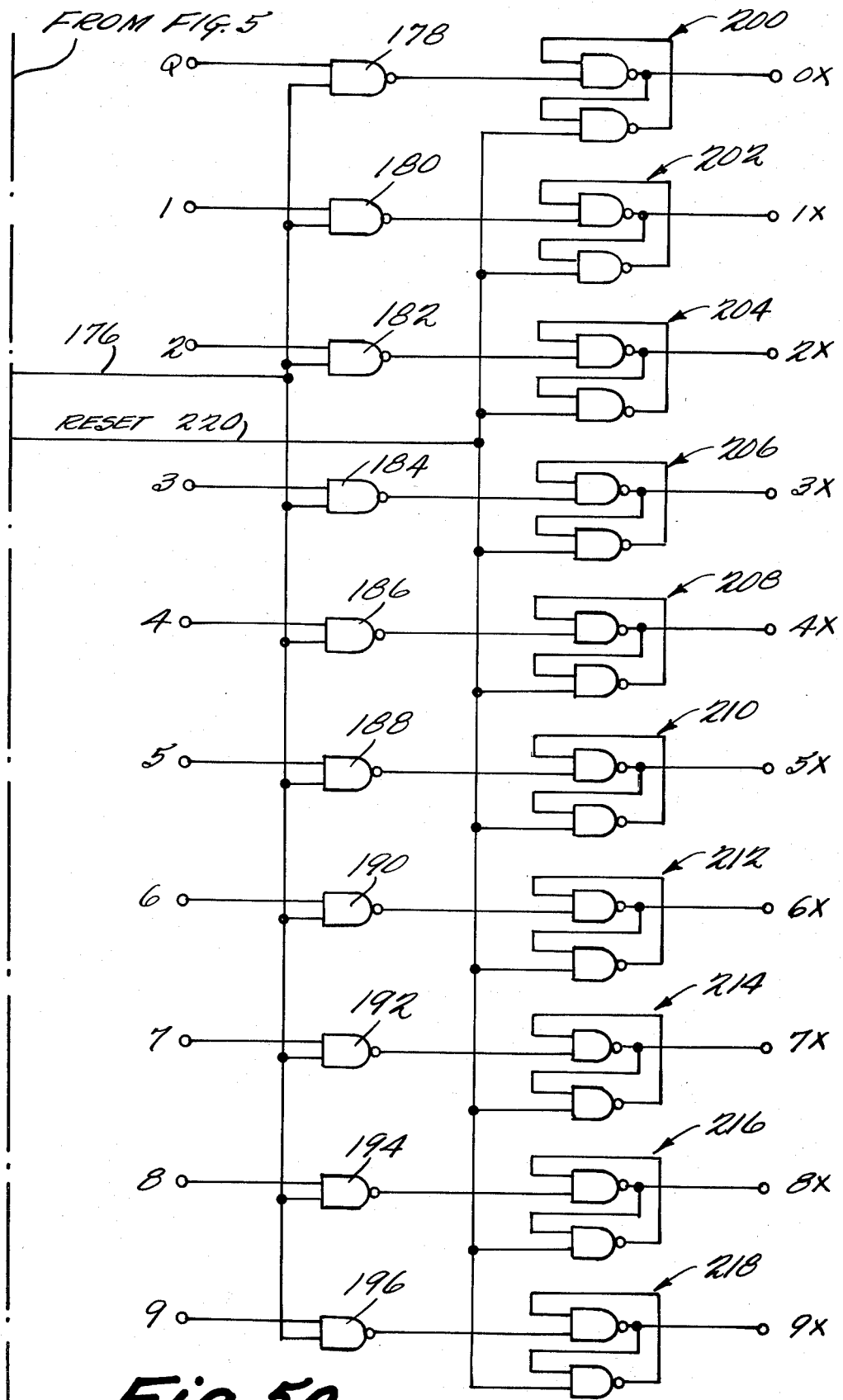

A plurality of conventional tone decoders 116, 118, 120, 122, 124, 126 and 128 are connected to line 114 and provide outputs as indicated when a tone of the associated frequency as shown in FIG. 5 is received. The outputs of tone decoders 116, 118, 120, 122, 124, 126 and 128 are applied to conventional gates 130, 132, 134, 136, 138, 140, 141, 142, 144, 146, 148 and 150 to provide 10 outputs each corresponding to one of the conventional digits, an 11th output corresponding to an * which is one of the conventional tone keys on a telephone and a 12th output corresponding to the symbol No. which represents another conventional tone key on a touch-tone telephone. Thus, each incoming combination of tones is decoded to provide an output on a line indicating the associated digit or symbol. The outputs of gates 130, 132, 134, 136, 138, 140, 141, 142, 144 and 146 are applied to gates 152, 154 and 156 with the outputs of those gates applied to an OR circuit comprising diodes 160, 162 and 164. The output of this OR circuit is in turn inverted by gate 166 to provide an output on line 168 each time that a coded signal is received associated with a digit. This output is called the strobe output and is utilized to decode two or more place digits as will be explained below.

The outputs of gates 130, 132, 134, 136, 138, 140, 141, 142, 144, 146, 148 and 150 are applied to the inputs to the control logic 28 which is illustrated in FIG. 5. Referring to FIG. 5, strobe line 168 is applied to a counter comprising flip-flops 170 and 172 via a pair of transistors 174 and 176. The counter comprising flip-flops 170 and 172 indicates whether a digit which is being received is the first digit in a string, the second digit in a string, etc. When the first digit is received, a signal is produced on line 168 which shifts the output condition of the counter comprising flip-flops 170 and 172. That condition is decoded by gate 230 to produce a signal which is applied to each of gates 232, 234, 236, 238, and 240 to enable each of these gates 232, 234, 236, 238, and 240 which are each connected to one of the digit outputs of the tone decoder circuitry of FIG. 4. Gates 232, 234, 236, 238 and 240 further each has its connected to a corresponding flip-flop which is comprised conventionally of a pair of gates. Flip-flop 260 is associated with gate 232, flip-flop 262 with gate 234, flip-flop 264, with gate 236, flip-flop 268, with gate 238, flip-flop 270 with gate 240. Each of these flip-flops shifts its output condition whenever the associated gate shifts its output condition as discussed above. The outputs of gates 200, 202, 204, 206, 208, 210, 212, 214, 216 and 218 are each connected to one input line on the relay driver's circuit of FIG. 6, and each of these lines identifies one line associated with one driver. Flip-flops 200, 202, 204, 206, 208, 210, 212, 214, 216 and 218 further are each connected to a reset line 220 which shifts these flip-flops back to their initial condition when a signal is produced on that reset line in response to a reset signal indicating that monitoring of a chosen line has ended. The reset signal is decoded by gate 148 in FIG. 4 and the output of that gate applied to transistor 224 to shift that transistor from its non-conductive to its conductive condition, grounding the reset inputs of flip-flops 170 and 172 to reset the counter to zero.

Receipt of one digit shifts counter comprising flip-flops 170 and 172 from one output condition to the other. Receipt of a second strobe signal indicating a second digit has arrived shifts the output of the counter further so that gate 230 no longer provides an enabling signal but rather the outputs of flip-flops 170 and 172 as decoded by gate 230 provides an enabling signal for gates 178, 180, 182, 184, 186, 188, 190, 192, 194, and 196 further identifying the line to be monitored.

As indicated above, each of the data lines 30 has a receive portion and a transmit portion and either the receive portion or the transmit portion can be monitored. Receipt of a No. on line 114 in FIG. 4 causes gate 150 to produce a signal which shifts the output condition of flip-flop 250 which is also reset by transistor 224.

The outputs of gates 232, 234, 236, 238 and 240 are applied to respectively associated flip-flops 260, 262, 264, 268 and 270. The outputs of flip-flops 260, 262 264, 268 and 270 are applied to five sets of gates each comprising two separate gates. One of the gates is enabled by one output of flip-flop 250, while the other gate is enabled by the other output. Thus, gate 271 will provide an enabling signal on line 272 when flip-flop 250 is shifted to a condition indicating that the transmission side of the line is to be monitored. Conversely gate 274 will provide an output on line 276 to enable a relay driver as discussed below, when the receive portion of a certain line is to be monitored. Gataes 280 and 282 are associated with flip-flop 262 while gates 284 and 286 are associated with flip-flop 264, gates 288 and 290 are associated with flip-flop 268 and gates 292 and 294 are associated with flip-flop 270.

Figure 7:
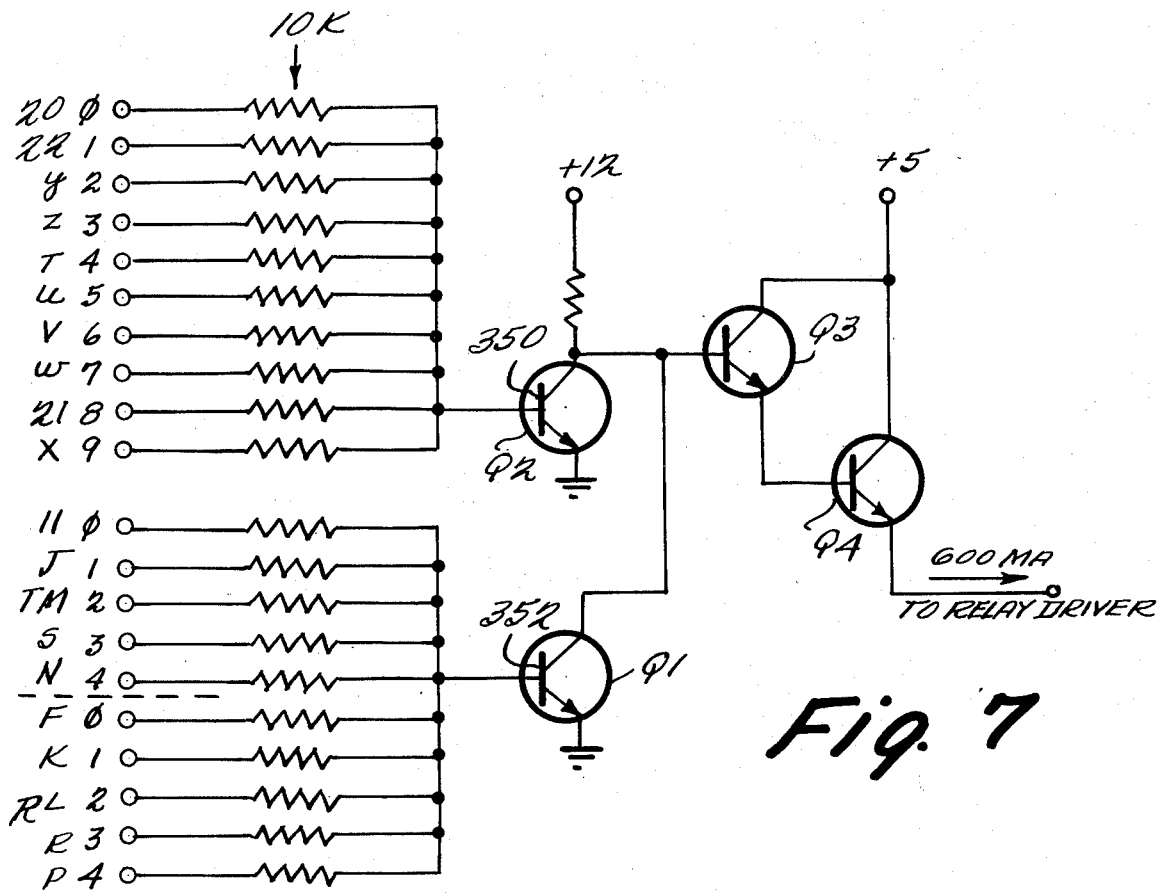
FIG. 7 shows a detailed schematic of circuitry for preventing more than one of the lines from being coupled to the audio buss at one time.
Figure 6:
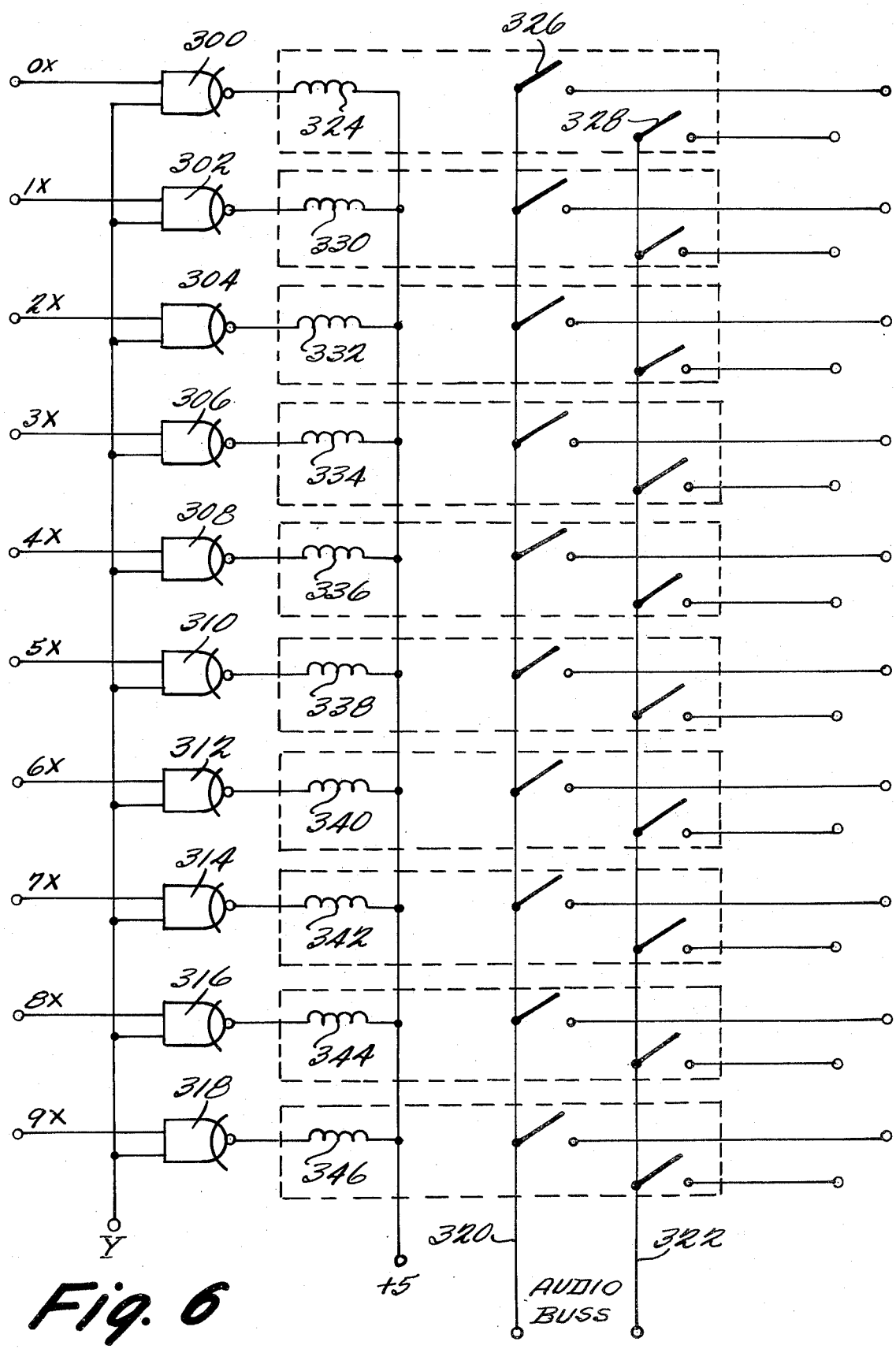
FIG. 6 shows a detailed schematic of one set of relay drivers.
Figure 9:
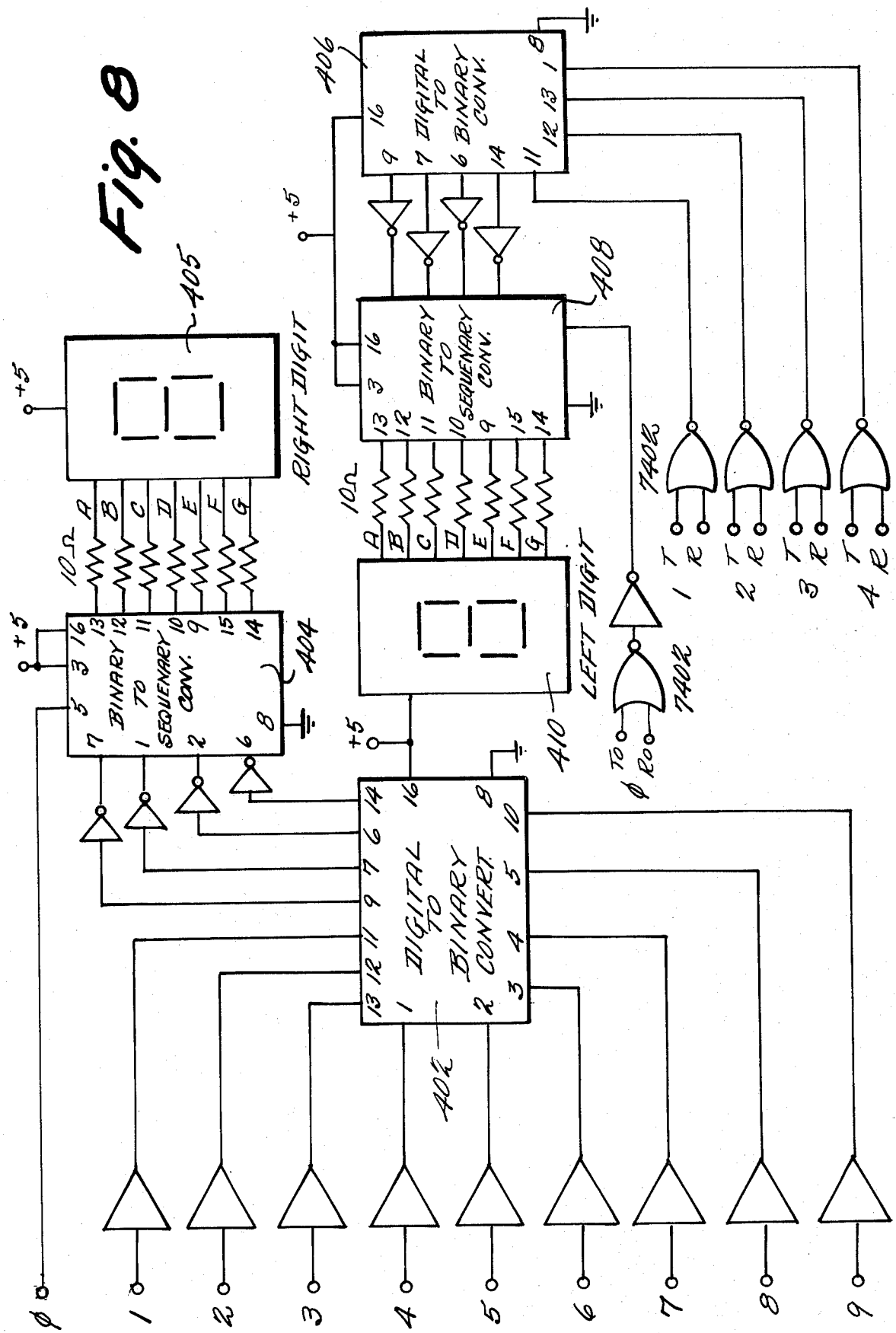

Reference is now made to FIG. 6 which illustrates one of the relay driver circuits for the data monitor. In the particular embodiment which is described in this application, ten such circuits are required. Each of the outputs of flip-flops 200, 202, 204, 206, 208, 210, 212, 214, 216 and 218 in FIG. 6 is connected to one of the inputs as indicated in FIG. 7 in each of the ten relay driver circuits. Further, each of the outputs of gates 271, 274, 280, 282, 284, 286, 288, 290, 292 and 294 are connected to each of the gates 300, 302, 304, 306, 308, 310, 312, 314, 316 and 318 is one of the ten relay driver circuits. In this fashion one of the lines in one of the relay driver circuits — transmit or receive — is identified. Each of gates 300, 302, 304, 306, 308, 310, 312, 314, 316 and 318 has associated with it a conventional relay which is activated to close two controlled switches to couple a selected line to the audio buss lines 320 and 322. Reed relay 324 is associated with gate 300 and when gate 300 is enabled current flows through relay coil 324, closing controlled switches 326 and 328 to connect one data line, either the transmit or receive portion, to the audio buss lines 320 and 322. Similarly, relays 330, 332, 334, 336, 338, 340, 342, 344, and 346 are respectively associated with gates 302, 304, 306, 308, 310, 312, 314, 316 and 318.

It is desirable to prevent two lines from ever being connected at the same time to an audio buss since the result will be confusion at the best and problems in the lines at the worst. Accordingly, the circuitry of FIG. 7 is provided and is connected to each of the respective relays of the relay boards such that either controlled transistor 350 or 352 shifts from its normally non-conductive condition to a conductive condition cutting off the supply of voltage to the relay drivers and in effect preventing interrogation of any of the remote lines, whenever two relays are activated.

Referring again to FIG. 2, the signals on audio buss lines 320 and 322 are connected to an isolation transformer 360 in filter and amplifier circuit 34. The output of isolation transformer 360 is applied to a filter circuit 362 which removes noise and the signals are then amplified in a conventional amplifier 364. The output of amplifier 364 is applied to the output telephone line via line 366. While an output signal is being produced, the input information is also fed to the negative input of operational amplifier 110 to prevent interference of outgoing and incoming information.

Figure 3:
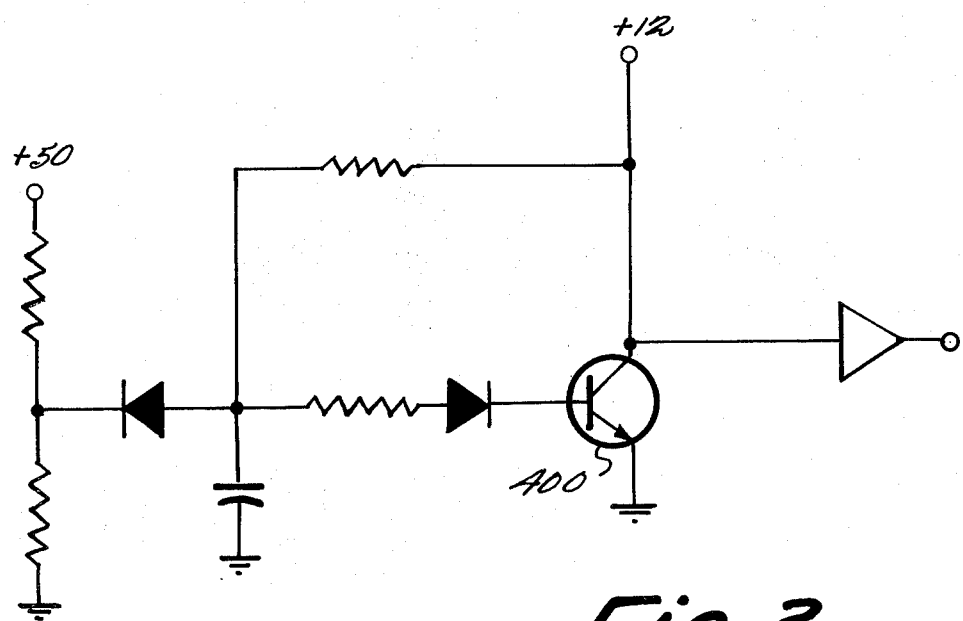
FIG. 3 shows a detailed schematic of circuitry for resetting the data monitor in the event of a power failure.

Reference is now made to FIG. 3 which illustrates a simple circuit for making sure that the circuitry is reset in the event of a power failure. If power should fail, transistor 400 shifts its output condition providing a reset signal.

Reference is now made to FIG. 8 which illustrates the output circuitry for the local display 35 indicating a chosen data line. This diplay 35 is particularly useful where the data monitor is being used at the remote station for interrogation. The outputs of flip-flops 200, 202, 204, 206, 208, 210, 212, 214, 216 and 218 are applied via conventional inverters to a decimal to binary converter 402 and the output of binary converter 402 applied to a further converter 404 which provides the seven outputs used to conventionally operate an LED 405 of one digit. Similarly, the outputs of gates 271, 274, 280, 282, 284, 286, 288, 290, 292 and 294 are applied to a further decimal to binary converter 406 and the output of that converter decoded by converter 408 to drive a second LED display 410.

Many changes in modifications in the above-described embodiments of the invention can, of course, be carried out without departing from the scope thereof. Accordingly, that scope is intended to be limited only by the scope of the appended claims.

What is claimed is:

1. A data monitoring apparatus comprising:
    a plurality of remote data lines,
    information concentrating means for receiving information on a plurality of data lines and concentrating the information for transmission,
    means for coupling said apparatus to a telephone line in response to receipt of a signal identifying said monitoring apparatus,
    means defining an audio buss,
    means for coupling said audio buss to said telephone line,
    means associated with each of said data lines for coupling the associated data line to said audio buss,
    means for receiving a coded telephone signal on said telephone line identifying one of a plurality of data lines at said apparatus and causing the coupling means associated with the identified data line to couple the identified data line to said audio buss,
    said means for coupling said monitoring means to a telephone line comprising an automatic answering circuit connected to said telephone line for coupling said line to said apparatus upon receipt of a given signal, and answer means connected to said telephone line and responsive to receipt of a predetermined number of ring signals on said telephone line for producing said given signal and applying said given signal to said automatic answering circuit.

2. An apparatus as in claim 1 further including reset means for receiving a reset signal and causing said coupling means to decouple a previously identified data line from said audio buss in response to receipt thereof.

3. An apparatus as in claim 2 further including means for producing a reset signal in the event of an electric power interruption.

4. An apparatus as in claim 2 wherein said answer means includes
    electronic switching means for shifting from a first to a second electrical condition while said telephone line is grounded during said ring signal,
    a ring capacitor connected to said electronic switching means for charging while said switching means is in said condition, and
    circuit means connected to said capacitor for shifting from a first to second output condition when said capacitor charges to a given level to produce said given signal.

5. An apparatus as in claim 4 wherein said electronic switching means includes a transistor and said circuit means includes a timer.

6. An apparatus as in claim 4 further including a manually operable source of telephone signals and a source of voltage connected to said telephone signals source for supplying power thereto and wherein said circuit means includes means for disconnecting said source of voltage from said telephone signals source when said circuit means is in said second output condition.

7. An apparatus as in claim 4 wherein said answer means further includes means for maintaining said capacitor charged after said circuit means shifts to said second condition.

8. An apparatus as in claim 4 wherein said circuit means includes
    means connected to said capacitor for shifting from a first to second outlet level when the voltage of said capacitor exceeds a predetermined level and for shifting from said second to said first level when the voltage of said capacitor is less than said predetermined level and wherein said maintaining means includes
    a resistor connected between said output of said shifting means and said capacitor.

9. An apparatus as in claim 4 further including first timer means connected to said reset means and to said telephone line coupling means for causing said telephone line coupling means to decouple said telephone line from said apparatus a predetermined time after a reset signal is received.

10. An apparatus as in claim 9 wherein said first timer means includes a further capacitor connected to said reset means for discharge upon receipt of said reset signal and charging thereafter and means connected to said further capacitor for shifting from a first to second output level when said further capacitor charges to a predetermined level with the output connected to said ring capacitor to discharge said ring capacitor when said output level shifts to said second output level.

11. An apparatus as in claim 10 wherein said causing means further includes digit decoding means for receiving digit signals one at a time identifying a remote data line and producing a digit signal upon receipt thereof and counter means connected to said reset means and to said digit decoding means for reset to zero each time said reset signal is received and for incrementing each time a digit signal is produced and further including second timer means connected to said counter means and to said telephone line coupling means for causing said telephone line coupling means to decouple said telephone line from said apparatus a predetermined time after a reset signal is received when said counter means is reset to zero.

12. An apparatus as in claim 11 wherein said second timer means includes a third capacitor connected to said reset means for discharge upon receipt of said reset signal and charging thereafter and means connected to said third capacitor for shifting from a first to second output level when said third capacitor charges to a predetermined level with the output connected to said ring capacitor to discharge said ring capacitor when said output level shifts to said second output level.

13. An apparatus as in claim 1 further including means for producing said coded telephone signal and an audio speaker means connected to said audio buss for reproducing the audio signals on said buss.

14. A data monitoring apparatus comprising:

a plurality of remote data lines;

information concentrating means for receiving information on a plurality of data lines and concentrating the information for transmission, means for coupling said apparatus to a telephone line in response to receipt of a signal identifying said monitoring apparatus, means defining an audio buss, means for coupling said audio buss to said telephone line, means associated with each of said data lines for coupling the associated data line to said audio buss, means for receiving a coded telephone signal comprising a sequence of combinations of audio tones on said telephone line identifying one of a plurality of data lines at said apparatus and causing the coupling means associated with the identified data line to couple the identified data line to said audio buss, including means for decoding signals representing each of digits 0–9, a reset signal and a receiver-transmit signal and producing an output on one associated digit-symbol line indicating the decoded signal, means connected to each digit-symbol line associated with a digit for producing a digit signal each time a signal representing a digit is decoded, counter means connected to said digit signal producing means for incrementing each time a digit signal is produced and for resetting each time a reset signal is received, a first set of gates each connected to one of said digit symbol lines associated with a digit and to said counter means for being enabled when an output appears on a connected digit-symbol line and said counter means is incremented to a first state, a first set of flip-flops each connected to one of said first set of gates for shifting from a first to second output when the connected gate is enabled and shifting from second to first output when said reset signal is received, a second set of gates each connected to one of said digit-symbol lines associataed with a digit and to said counter means for being enabled when an output appears on a connected digit-symbol line and said counter means is incremented to a second state and a second set of flip-flops each connected to one of said second set of gates for shifting from a first to a second output when the connected gate is enabled and shifting from said second to said first output when said reset signal is received.

15. An apparatus as in claim 14 wherein said causing means further includes a receive-transmit flip-flop for shifitng from a first to a second output when a receive-transmit signal is received and shifting from said second to said first output when a reset signal is received and connected to said second set of gates for enabling some of said gates of said second set when said receive-transmit flip-flop is in said first condition and enabling the rest of said gates of said second set when said receive-transmit flip-flop is in said second condition.

16. An apparatus as in claim 14 wherein said cuasing means includes a plurality of relays each connected to one of said remote data lines and having controlled switches for connecting that data line to said audio buss, and gate means connecting each of said relays to flip-flops of said first and second sets for activating a relay to cause connection when the line connected to that relay is identified.

17. An apparatus as in claim 14 further including means for displaying received coded telephone signals identifying one of a plurality of data lines.

18. An apparatus as in claim 14 further including means for applying the signals on said audio buss to an isolation transformer, means for filtering the output of said isolation transformer, and means for amplifying the output of said filtering means.

* * * * *